United States Patent [19]
Goach, Jr. et al.

[11] Patent Number: 5,701,498
[45] Date of Patent: Dec. 23, 1997

[54] METHOD AND APPARATUS FOR A STRUCTURED ASCII BROWSER FOR ONLINE PUBLICATIONS FORMATTED IN A BOOKMASTER FORMAT

[75] Inventors: Kenneth Edmund Goach, Jr.; Gregory Phillip Meyer; Jeffrey Scott Sims, all of Austin, Tex.

[73] Assignee: International Business Machines Corporation, Armonk, N.Y.

[21] Appl. No.: 560,415

[22] Filed: Nov. 17, 1995

[51] Int. Cl.⁶ .................................................. G06F 17/30
[52] U.S. Cl. ........................... 395/762; 395/761; 395/806
[58] Field of Search ........................... 395/145, 185.01, 395/761, 762, 806; 380/4, 9; 364/518, 419.1; 365/600

[56] References Cited

U.S. PATENT DOCUMENTS

| | | | |
|---|---|---|---|
| 4,864,516 | 9/1989 | Gaither et al. | 364/518 |
| 4,996,665 | 2/1991 | Nomura | 395/616 |
| 5,095,423 | 3/1992 | Gramlich et al. | 395/604 |
| 5,129,082 | 7/1992 | Tirfing et al. | 395/603 |
| 5,146,552 | 9/1992 | Cassorla et al. | 395/145 |
| 5,202,982 | 4/1993 | Gramlich et al. | 395/602 |
| 5,204,897 | 4/1993 | Wyman | 380/4 |
| 5,214,696 | 5/1993 | Keiser, II et al. | 380/4 |
| 5,222,236 | 6/1993 | Potash et al. | 395/600 |
| 5,247,575 | 9/1993 | Sprague et al. | 380/9 |
| 5,257,186 | 10/1993 | Ukita et al. | 395/793 |
| 5,278,980 | 1/1994 | Pedersen et al. | 395/608 |
| 5,367,621 | 11/1994 | Cohen et al. | 395/154 |
| 5,428,529 | 6/1995 | Hartrick et al. | 364/419.1 |
| 5,532,920 | 7/1996 | Hartrick et al. | 364/419.1 |
| 5,553,216 | 9/1996 | Yashioka et al. | 395/145 |
| 5,586,252 | 12/1996 | Barnard et al. | 395/185.01 |

OTHER PUBLICATIONS

"Delivering Documents Through Digital Media", The Seybold Report on Publishing Systems, v24, n3, pS22(6), Oct. 1994.

Walter, Mark "Electronic Delivery: Matching Technology to Requirements", The Seybold Report on Desktop Publishing, v7, n4, p3(22), Dec. 1992.

Russell et al. "Health Plan On a Disk", PC World, v12, n4, p61(1), Apr. 1994.

"Teletraining Institute: Uniquely Serving the Needs of Distance Education", T H E Journal, v21, n9, p30(2), Apr. 1992.

http://booksr2.raleigh.ibm.co *IBM BookManager Print Preview*, 1.0 Chapter 1. Introduction to Build/2, Getting Started, pp. 1–14, Nov. 13, 1993.

http://booksrv2.raleigh.ibm.co *IBM BookManager Print Preview*, 1.0 Introducing IBM SAA BookManager READ/2: General Information, pp. 1–19, Jan. 28, 1994.

*Primary Examiner*—Thomas G. Black
*Assistant Examiner*—Charles L. Rones
*Attorney, Agent, or Firm*—David A. Mims, Jr.

[57] ABSTRACT

Online presentation of BOOKMASTER based publications on an ASCII terminal. Flat ASCII files are created directly from BOOKMASTER publications and an ASCII browser is invoked. A list of viewable publications is presented to a user. After the user selects a publication, the selected publication is opened and the chapter titles are displayed. After the user selects a specific chapter, the ASCII browser proceeds directly to that chapter and displays the material contained therein. The browser repeatedly retrieves chapters of the publication without restarting the program.

13 Claims, 7 Drawing Sheets

:p.
Network interfaces, routing services, and other network
services must be available before RPC starts.
The :pk.dced:epk. daemon is started in the :pk./etc/dce/rc.dce:epk. file.
The :pk./etc/dce/rc.dce:epk. file can be invoked from
:pk./etc/inittab:epk. so that DCE services can be
brought up each time the machine boots.
See :hdref refid=jssmit. for information on the SMIT menu for starting
&dssax at reboot.

FIG. 1

<"paragraph">

<|, "35"><| :paragraph",
    Font = @i*,
    Subcomponent = yes><FO><Autonum, "label", 1, First = Yes>
<End Sub><FO>Network interfaces, routing services, and other network
services must be available before <SR>
RPC starts. The <F5@Z7@Lam>dced<FO> daemon is started in the <F5@Z7@Lam>/etc/d
ce/rc.dce<FO> file. The <F5@Z7@Lam>/etc/dce/rc.dce<FO> <SR>
file can be invoked from <F5@Z7@Lam>/etc/inittab<FO> so that DCE services
can be brought up each time the <SR>
machine boots. See "Using SMIT to Start DCE, DFS, and NFS/DFS Authenticating
<SR>
Gateway Now and at System Restart" for information on the SMIT menu
for starting DCE <SR>
for AIX at reboot.

FIG. 2

Network interfaces, routing services, and other network services
must be available before RPC starts. The dced daemon is started
in the /etc/dce/rc.dce file. The /etc/dce/rc.dce file can be
invoked from /etc/inittab so that DCE services can be brought up
each time the machine boots. See "Using SMIT to Start DCE, DFS,
and NFS/DFS Authenticating Gateway Now and at System Restart" for
information on the SMIT menu for starting DCE for AIX at reboot.

FIG. 3

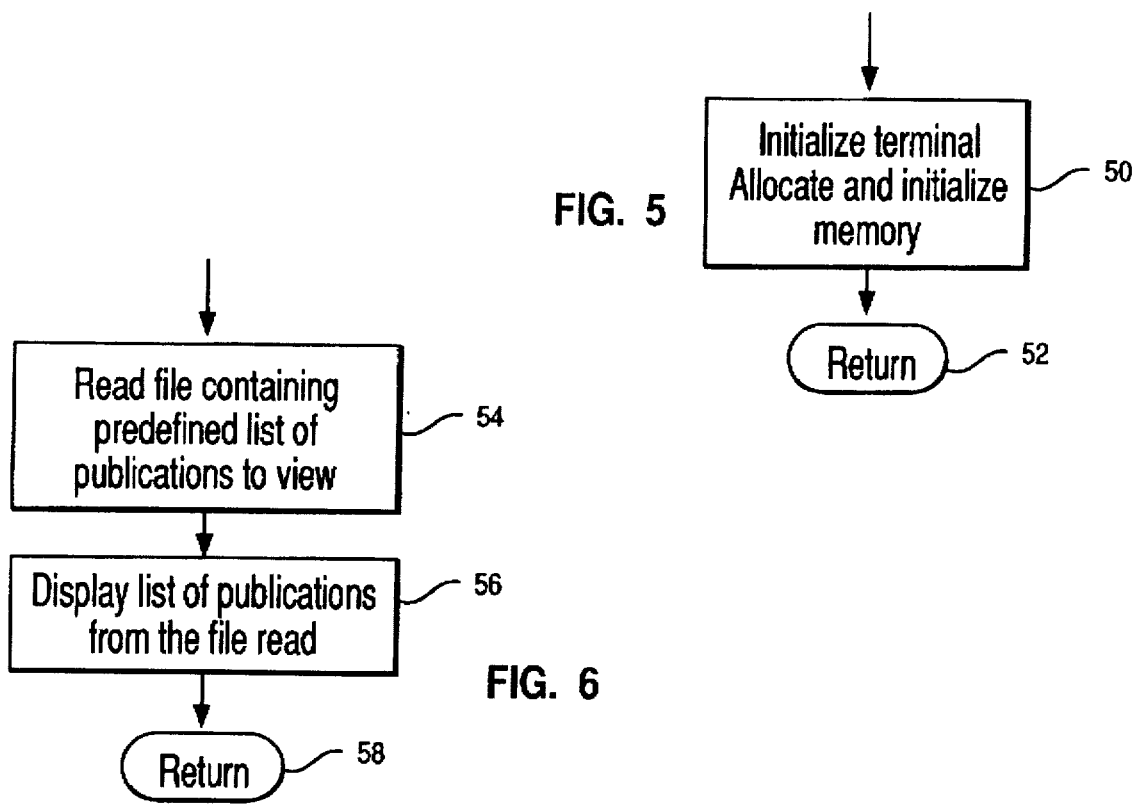

METHOD AND APPARATUS FOR A STRUCTURED ASCII BROWSER FOR ONLINE PUBLICATIONS FORMATTED IN A BOOKMASTER FORMAT

FIELD OF THE INVENTION

The present invention relates to data processing systems, and more particularly, to providing access to online publications using an ASCII browser.

BACKGROUND OF THE INVENTION

The advent of online presentations on computer systems requires rapid, effortless recovery of data stored on workstations or networks. Data my be stored in any number of formats which must be interpreted and examined by access facilities. For example, publications may be created in one database using a BOOKMASTER format and in another database using an INTERLEAF format. When the two different publications must be displayed on either graphic or ASCII terminals, various pre-processing steps may be required to display the different formats. For example, users can use the INFOEXPLORER browser to display publications in the INTERLEAF format on graphics or ASCII terminals. However, the INFOEXPLORER browser is unable to display publications in a BOOKMASTER format. BOOKMASTER formatted publications can present information on graphics terminals but not on ASCII terminals. Therefore, publications in the BOOKMASTER format must be first converted to INTERLEAF format, and built with INFOCRAFTER before the INFOEXPLORER browser can display the publications. As can be appreciated, the conversion process frequently requires human intervention which produces throw-away work, as the resulting converted database is only valid for a particular database release.

A generic solution for displaying BOOKMASTER based publications may be found in the use of an editor. BOOKMASTER publications can be converted into ASCII format. The editor provides the necessary function to view flat ASCII files. However, the editor presents all the information at one time, which makes it difficult to directly index to a specific chapter.

Another solution is a search facility such as the SEARCHIT software manufactured by the SunSoft Corporation. The SEARCHIT program is a text-retrieval program which allows a user to type one word, then mouse-click a button. The program then presents documents that contain the word in a list of documents in order of relevance. The user may then click on a document, and a viewer pane displays an ASCII text version of the document, even if the document is an ISLANDWRITE or INTERLEAF file, with each occurrence of the search word underscored and a cursor on the first word. Prior to use, directories to be searched must be indexed. Indexing takes place automatically and, because it is time-consuming, can be scheduled for overnight or weekends. However, SEARCHIT cannot display BOOKMASTER publications nor allow direct indexing to a specific chapter in a publication.

It is therefore desirable to have an improved method and apparatus for displaying online publications on an ASCII terminal created in a BOOKMASTER format.

SUMMARY OF THE INVENTION

This invention relates to a method and apparatus for providing online presentation of BOOKMASTER publications on an ASCII terminal. Flat ASCII files are created directly from BOOKMASTER publications. The ASCII browser is then invoked and the user specifies the publications to view. After choosing a publication, the selected publication is opened and its chapter headings are presented for selection by the user. After selecting a specific chapter, the ASCII browser of the present invention proceeds directly to the chapter and displays the material contained therein. The user may view and scroll through any chapter in both a forward and backward direction. The ASCII browser allows repeated retrieval of chapters and publications without restarting the program. Consequently, the user may view BOOKMASTER based online publications on ASCII terminals.

BRIEF DESCRIPTION OF THE DRAWINGS

FIG. 1 is a partial example of a publication created in a BOOKMASTER format.

FIG. 2 is a partial example of a publication created in an INTERLEAF format.

FIG. 3 is an example of a partial publication in a flat ASCII format.

FIG. 5 is a flow diagram of an initialization procedure for the present invention.

FIG. 6 is a flow diagram of a procedure for reading and showing a publication list using the invention.

FIG. 7 is a flow diagram of a procedure for building an index for the invention.

DETAILED DESCRIPTION OF THE EMBODIMENTS

This invention provides a method and apparatus for displaying IBM BOOKMASTER formatted files on ASCII terminals. It is well known in the art how to display files formatted in an INTERLEAF format on both ASCII and graphics terminals. However, there is no solution for easily displaying IBM BOOKMASTER formatted files on ASCII terminals. Turning to FIG. 1, there is shown an example of an IBM BOOKMASTER source file. As appreciated by those skilled in the art, the IBM BOOKMASTER source file contains a number of control codes (e.g., ":p.", ":pk.", ":hdref.") within a publication, which must be properly interpreted to display the publication. FIG. 2 shows an InterLeaf formatted source file. The INTERLEAF formatted source file is radically different from the BOOKMASTER source file. One technique for displaying BOOKMASTER source files is by converting them to well known displayable source files, such as the INTERLEAF source file. The INTERLEAF format permits a publication to be built into a viewable database using an accompanying tool called INFO-CRAFTER. Significant human interaction is required to convert BOOKMASTER formatted files into INTERLEAF files using the INFOCRAFTER. As appreciated by one skilled in the art, the resultant conversion is throw-away work because the resulting database is valid only for a particular database release. The INTERLEAF formatted file may be viewed on graphics or ASCII terminals using an INFOEXPLORER browser.

Turning to FIG. 3, there is shown a flat ASCII file created directly from a BOOKMASTER file. As appreciated by those skilled in the art, BOOKMASTER based online publications tend to be very large. The structured ASCII browser of the present invention is therefore needed so the user can view and retrieve information by directly indexing to chapters of interest. This invention allows the user to conveniently view relevant information without having to wade through undesired information.

Figure 4:
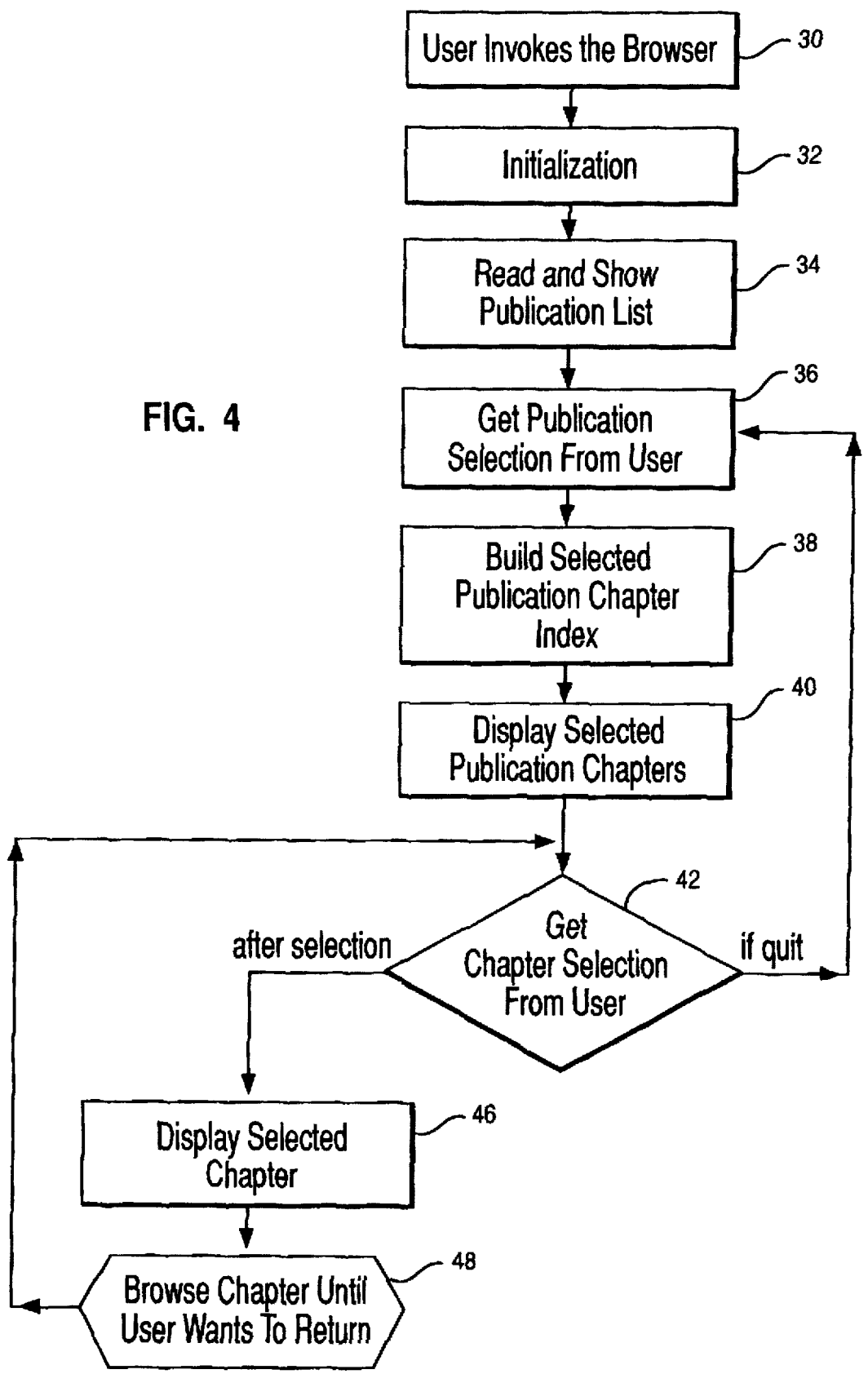
FIG. 4 is a flow diagram of a procedure for viewing an online publication on an ASCII terminal created in a BOOKMASTER format using the present invention.

With reference to FIG. 4, there is shown a procedure for viewing an online publication, created in a BOOKMASTER format, on an ASCII terminal using the invention. At block 30, the user invokes the browser on the ASCII terminal. The browser enters an initialization routine as shown in block 32, and reads and displays a publication list to the user as shown in block 34. At block 36, the procedure retrieves the publication selected by the user, and builds the selected publications index as shown in block 38. The browser displays the selected publications chapter list to the user at the ASCII terminal as shown in block 40. At block 42, the procedure fetches the chapter selected by the user from the displayed publication chapter list, and displays the selected chapter to the user on the ASCII terminal, as shown in block 46. The procedure allows the user to continue browsing chapters in a publication until the procedure is terminated by the user as shown in block 48.

Returning to block 32, of FIG. 4, additional details of the initialization step will be divulged. Turning to FIG. 5, at block 50, the browser initializes the ASCII terminal by allocating and initializing memory. After initializing the ASCII terminal, the procedure executes a return as shown in block 52.

Referring again to FIG. 4, block 34, the step for reading and showing the publication list will be further expanded. Referring to FIG. 6, at block 54, the procedure reads the file containing a predefined list of publications viewable by the user. At block 56, the procedure displays the list of publications and executes a return at block 58.

Turning again to FIG. 4, block 38, additional details for building the publication index will be disclosed. Referring to FIG. 7, the procedure opens the file of the selected publication at block 60. At block 62, the procedure reads a line of the file. A test is conducted at block 64 to determine if the line of text contains an end-of-file indicator. If YES, the procedure goes to block 70 and executes a return. Else, at block 66, a test is carried out to determine if the line contains a chapter delimiter. If YES, processing proceeds to block 68 where the procedure adds a pointer for the chapter, and chapter heading text, to the publication chapter index list. Processing then proceeds to block 62 where the next line of the file is read. Returning to block 66, if the line of text is not a chapter delimiter, processing returns to block 62 where index processing continues.

Figure 8:
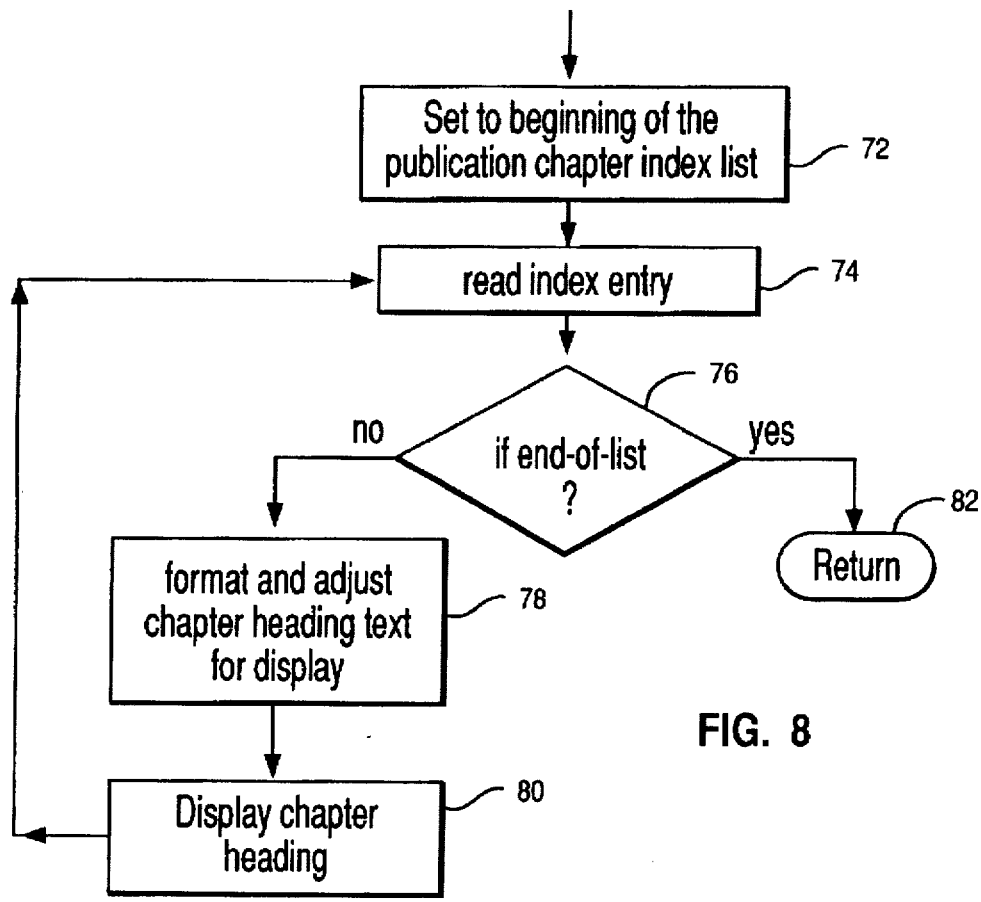
FIG. 8 is a flow diagram of a process for displaying publication chapters using the invention.

Returning to FIG. 4, block 40, details of the step for displaying selected publication chapter headings will be given. With reference to FIG. 8, block 72, the procedure sets the browser to the beginning of the publication chapter index list. At block 74, the procedure reads the index entry. A test is then carried out at block 76 to determine if an end-of-list indicator has been read. If YES, processing branches to block 82 where a return is executed. If NO, at block 78, the procedure formats and adjusts the chapter heading text for display on the ASCII terminal. At block 80, the chapter heading is displayed to the user at the ASCII terminal, and processing proceeds to block 74, to continue displaying the chapters of the publication.

Figure 9:
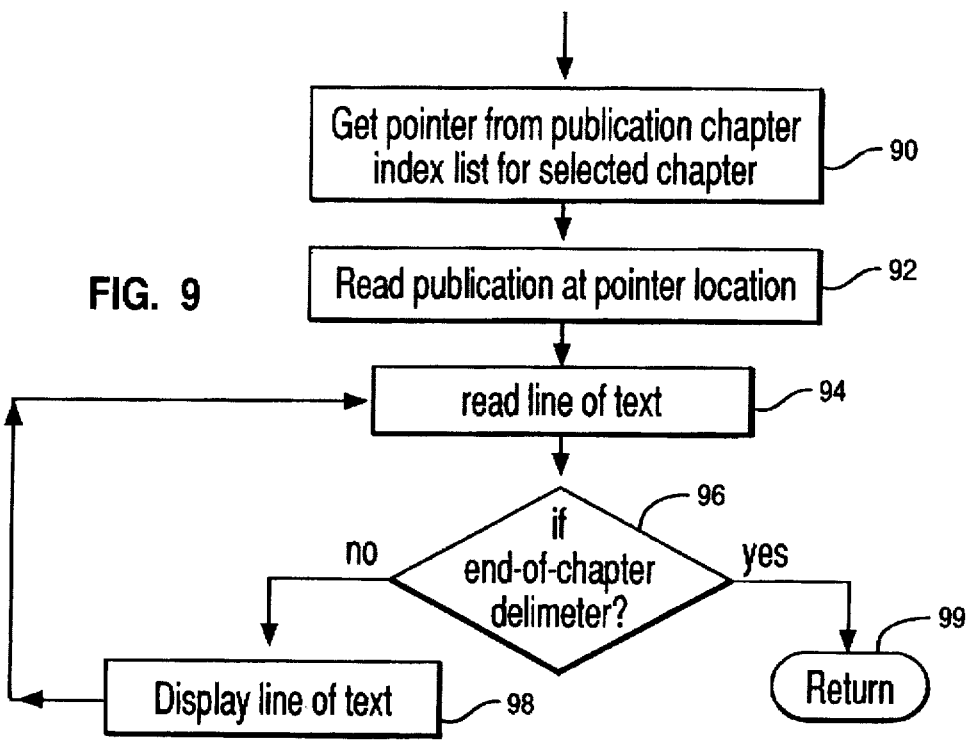
FIG. 9 is a flow diagram of the procedure for displaying selected chapters using the present invention.

Returning to FIG. 4, block 46, details of the step for displaying selected chapters of the publication will be divulged. Turning to FIG. 9, block 90, the browser fetches the pointer from the publication chapter index list for the chapter selected by the user. At block 92, the publication is read at the pointer location, and the browser reads a line of text as shown in block 94. A check is conducted at block 96 to determine if an end-of-chapter delimiter has been read. If YES, processing branches to block 99, where a return is executed. Else, at block 98, the browser displays the line of text and returns to block 99 to read another line of text.

Figure 10:
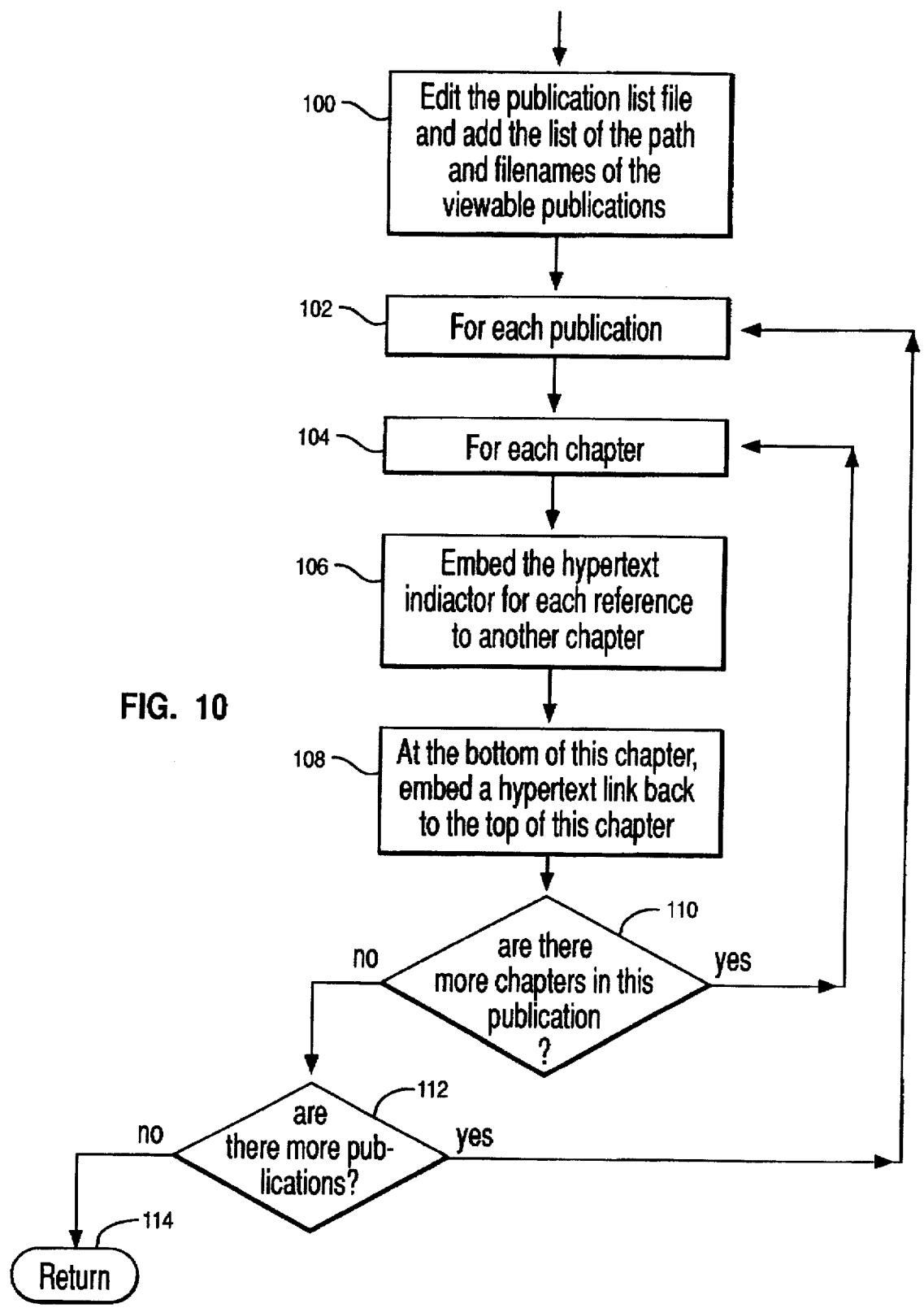
FIG. 10 is a flow diagram of an administrator's procedure for creating the viewable publication list and for creating links in a predefined list of publications.

Referring to FIG. 10, a procedure for creating the viewable publication list and for creating links in the predefined list of publications will be given. At block 100, the procedure edits a publication list file, and adds the list of the path and file names of the viewable publications to the publication list file. The scan for other chapter references is done for each publication as shown in block 102, for each chapter for the publication as shown in block 104. At block 106, the procedure embeds the hypertext indicator in the chapter for each reference to another chapter. The procedure then embeds, at the bottom of the current chapter, a hypertext link back to the top of the chapter as shown in block 108. A test is conducted at block 110 to determine if there are more chapters in the publication. If YES, processing returns to block 104 to access another chapter. If NO, at block 112, a test is carried out to determine if there are more publications. If YES, processing returns to block 102, for handling the next publication. If NO, at block 114, the procedure executes a return.

Figure 11:
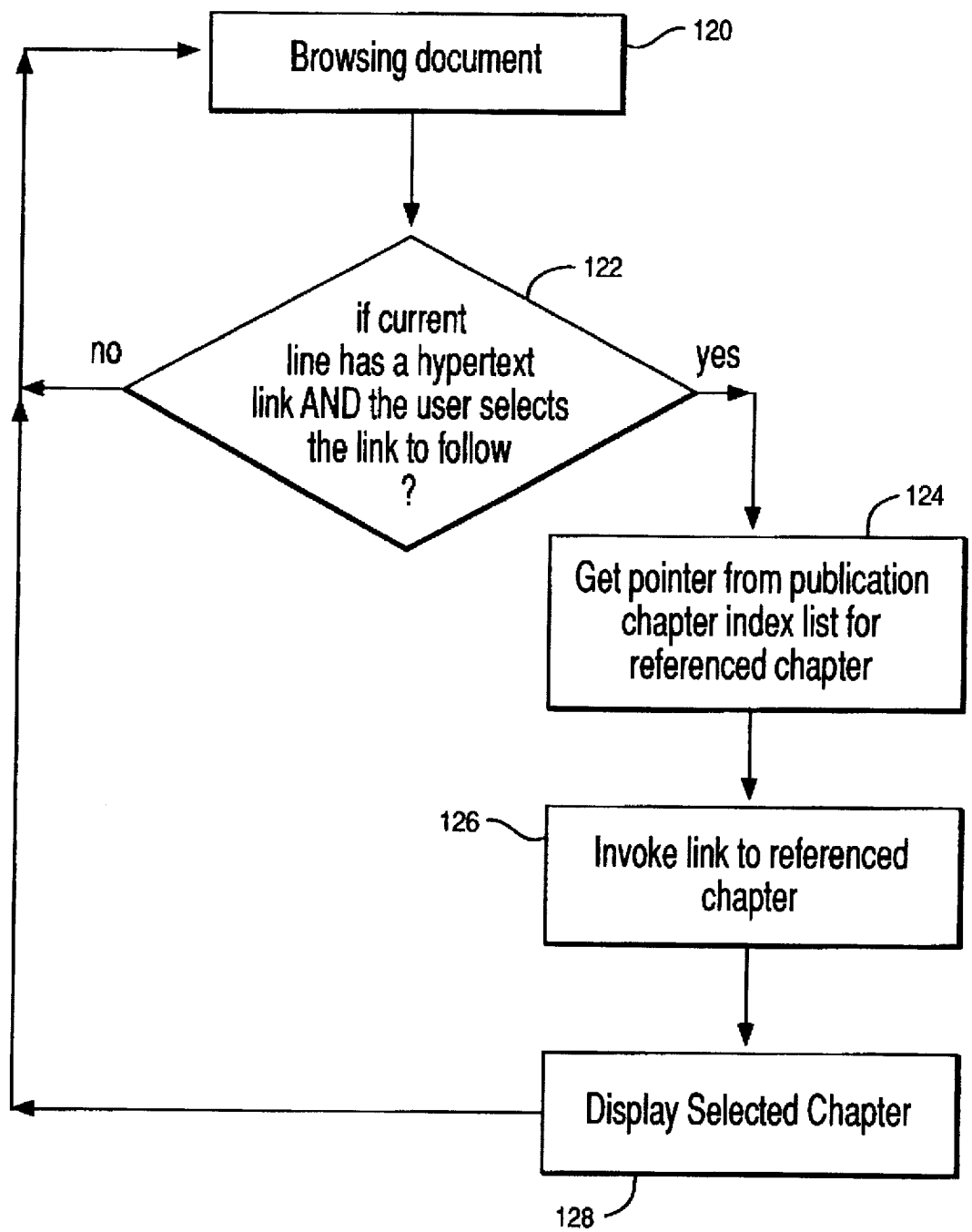
FIG. 11 is a flow diagram of a procedure for browsing documents containing hypertext links using the present invention.

Turning now to FIG. 11, a procedure will be illustrated for browsing a publication containing the links added by the procedure described in FIG. 10. At block 120, while browsing the document, the procedure performs a check at block 122, to determine if the current line of text contains a hypertext link, and that the user has selected the link. If NO, processing returns to block 120 where browsing the document continues. If YES, at block 124, the procedure gets the pointer from the publication chapter index list, and invokes the link to the referenced chapter as shown in block 126. At block 128, the procedure displays the selected chapter.

Figure 12:
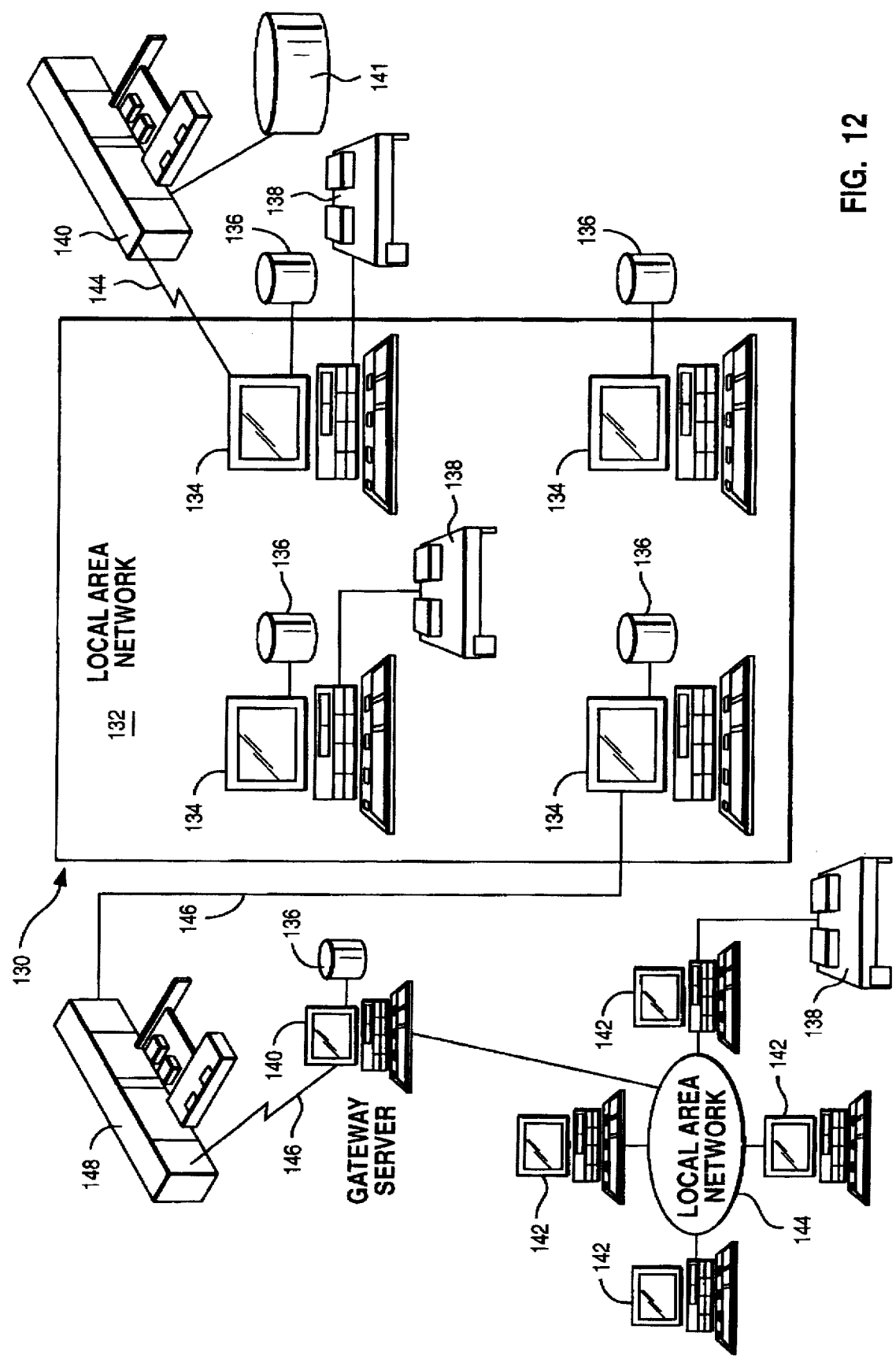
FIG. 12 is a network containing workstations where the invention may be practiced.

Referring now to FIG. 12, there is depicted a pictorial representation of a data processing system 130 that may be utilized to implement a method and system of the present invention. As may be seen, data processing system 130 may include a plurality of networks, such as local area networks (LAN) 132 and 144, each of which preferably includes a plurality of individual computers 134 and 142, respectively. Of course, those skilled in the art will appreciate that a plurality of intelligent work stations (IWS) coupled to a host processor may be utilized for each such network.

As is common in such data processing systems, each individual computer may be coupled to a storage device 136 and/or a printer/output device 138. One or more such storage devices 136 may be utilized, in accordance with the method of the present invention, to store BOOKMASTER publications or resource objects which may be periodically accessed by any user within data processing system 130. In a manner well known in the prior art, each such document or resource object stored within a storage device 136 may be freely interchanged throughout data processing system 130 by transferring a document to a user at an individual computer 134 or 142, for example. It is equally well known in the art that a computer program product having a computer readable medium such as a diskette, containing the program logic of the present invention, may be inputted at individual computers 134 or 142.

Still referring to FIG. 12, it may be seen that data processing system 130 may also include multiple mainframe computers, such as mainframe computer 140, which may be preferably coupled to LAN 132 by means of communications link 144. Mainframe computer 140 may also be coupled to a storage device 141 which may serve as remote storage for LAN 132. Similarly, LAN 132 may be coupled via communications link 146 to a gateway server 140. Gateway server 140 is preferably an individual computer or IWS which serves to link LAN 144 to LAN 132.

As discussed above, with respect to LAN 144 and LAN 132, a plurality of BOOKMASTER documents or resource objects may be stored within storage device 141 and controlled by mainframe computer 140, as Resource Manager or Library Service for the resource objects thus stored. Of course, those skilled in the art will appreciate that mainframe computer 140 may be located a great geographic distance from LAN 132, and similarly LAN 132 may be located a substantial distance from LAN 144. For example, LAN 132 may be located in Austin, Texas while LAN 144 may be located in New York. A multitasking environment including multiple processes may be found on individual computers 134 and 142, on gateway server 140, on some computer in LAN 132 or 144, or on mainframe computer 140.

While the invention has been described with respect to a preferred embodiment thereof, it will be understood by those skilled in the art that various changes in detail my be made therein without departing form the spirit, scope, and teaching of the invention. Accordingly, the herein disclosed invention is to be limited only as specified in the following claims.

What we claim is:

1. A method, implemented in a computer, of building an index of chapter titles for a document, wherein selection of index items in the index cause A document browser to present a chapter to a user corresponding to the selected index item, comprising the steps of:

searching for characters indicative of a chapter title embedded in a BOOKMASTER formatted document by said document browser;

responsive to finding the indicated characters, building an index of chapter titles in an ASCII format by opening and reading a line of said BOOKMASTER formatted document until a chapter delimiter is encountered, each index item corresponding to a found chapter title; and building a set of links between each index item and a location in the formatted document where the chapter titles were found;

presenting the chapter index to the user by said browser on an ASCII terminal; and responsive to selection of an index item, presenting the formatted document starting at the location in the formatted document where the chapter was found on the ASCII terminal.

2. The method of claim 1 further comprising:

searching the formatted document for additional references to chapter titles in the formatted document which do not correspond to the locations in the set of links by said browser; and responsive to finding additional references, embedding an indicator in the formatted document linking the location of the additional references to the location of the chapter title.

3. The method of claim 1 wherein the characters indicative of a chapter title set off by a known chapter delimiter are a set of characters used in association with a chapter title.

4. The method of claim 2 wherein the searching step for additional references uses alphanumeric characters found in association with characters indicative of a chapter title.

5. A method, implemented in a computer, of building a distributed index for a BOOKMASTER formatted document, comprising the steps of:

searching for chapter titles in the BOOKMASTER formatted document by a browser;

building an index of chapter titles in an ASCII format by opening and reading a line of the BOOKMASTER formatted document until a chapter delimiter is encountered in the formatted document;

searching for references to chapter titles in the formatted document by said browser;

embedding an indicator at each occurrence of a reference in the formatted document; and linking the index and indicator to locations of the chapter titles in the formatted document by said browser.

6. An apparatus for building an index of chapter titles for a document, wherein selection of index items in the index cause a document browser to present a chapter to a user corresponding to the selected index item, comprising:

means of searching for characters indicative of a chapter title in the document by said browser, wherein said document is in a BOOKMASTER formatted form;

responsive to finding the indicated characters, means of building an index of chapter titles in an ASCII format by opening and reading a line of said BOOKMASTER formatted document until a chapter delimiter is encountered, each index item corresponding to a found chapter title; and means of building a set of links between each index item and a location in the formatted document where the chapter titles were found;

means of presenting the chapter index to the user by said browser on an ASCII terminal; and responsive to selection of an index item, means of presenting the formatted document starting at the location in the formatted document where the chapter was found on the ASCII terminal.

7. The apparatus of claim 6 further comprising:

means for searching the formatted document for additional references to chapter titles in the document which do not correspond to the locations in the set of links by said browser; and responsive to finding additional references, means for embedding an indicator in the formatted document linking the location of the additional references to the location of the chapter title.

8. The apparatus of claim 6 wherein the characters indicative of a chapter title set off by a known chapter delimiter are a set of characters used in association with a chapter title.

9. The apparatus of claim 7 wherein the means for searching for additional references uses alphanumeric characters found in association with characters indicative of a chapter title.

10. An apparatus for building a distributed index for a BOOKMASTER formatted document, comprising:
   means for searching for chapter titles in the BOOKMASTER formatted document;
   means for building an index of chapter titles in an ASCII format by opening and reading a line of said BOOKMASTER formatted document until a chapter delimiter is encountered in the formatted document by a browser;
   means for searching for references to chapter titles in the formatted document;
   means for embedding an indicator at each occurrence of a reference in the formatted document; and
   means for linking the index and indicator to locations of the chapter titles in the formatted document.

11. A computer program product having a computer readable medium having computer program logic recorded thereon for building an index of chapter titles for a formatted document, wherein selection of index items in the index cause a document browser to present a chapter to a user corresponding to the selected index item, comprising:
   computer readable medium means for searching for characters indicative of a chapter title embedded in a BOOKMASTER formatted document;
   responsive to finding the indicated characters, computer readable medium means for building an index of chapter titles in an ASCII format by opening and reading a line of said BOOKMASTER formatted document until a chapter delimiter is encountered, each index item corresponding to a found chapter title; and
   computer readable medium means for building a set of links between each index item and a location in the formatted document where the chapter titles were found;
   computer readable medium means for presenting the chapter index to the user by said browser on an ASCII terminal; and
   responsive to selection of an index item, computer readable medium means for presenting the formatted document starting at the location in the formatted document where the chapter was found by said browser on the ASCII terminal.

12. The computer program product of claim 11 further comprising:
   computer readable medium means for searching the formatted document for additional references to chapter titles in the formatted document which do not correspond to the locations in the set of links by said browser; and
   responsive to finding additional references, computer readable medium means for embedding an indicator in the formatted document linking the location of the additional references to the location of the chapter title.

13. The computer program product of claim 11 wherein the characters indicative of a chapter title set off by a known chapter delimiter are a set of characters used in association with a chapter title.

* * * * *